US005133605A

United States Patent [19]

Nakamura

[11] Patent Number: 5,133,605

[45] Date of Patent: Jul. 28, 1992

[54] MONITORING SYSTEM EMPLOYING INFRARED IMAGE

[75] Inventor: Tetsuya Nakamura, Machida, Japan

[73] Assignee: Fujitsu Limited, Kawasaki, Japan

[21] Appl. No.: 625,373

[22] Filed: Dec. 11, 1990

[30] Foreign Application Priority Data

Dec. 11, 1989 [JP] Japan ................................ 1-320880

[51] Int. Cl.$^5$ ................................ G01J 5/00

[52] U.S. Cl. ................................ 374/124; 374/129; 250/338.1; 358/113

[58] Field of Search ............... 374/129, 124, 137, 133, 374/120, 121; 250/330, 334, 338.1, 342; 358/113, 81, , 82, 110; 356/72

[56] References Cited

U.S. PATENT DOCUMENTS 3,748,471 7/1973 Ross et al. ................ 358/113
3,812,483 5/1974 Graves ................ 358/113
3,868,508 2/1975 Lloyd ................ 358/113
3,869,565 3/1975 Olson ................ 358/113
3,924,130 12/1975 Cohen et al. .
4,170,987 10/1979 Anselmo et al. ................ 358/81
4,408,224 10/1983 Yoshida .
4,608,597 8/1986 Jaeger ................ 358/113
4,608,599 8/1986 Kaneko et al. .
4,672,439 6/1987 Florence et al. ................ 358/113
4,779,095 10/1988 Guerreri .
4,807,027 2/1989 Muto .
4,823,290 4/1989 Fasack et al. .
4,967,276 10/1990 Murakami et al. ................ 250/330
4,999,614 3/1991 Ueda et al. ................ 340/588
5,032,727 7/1991 Cox, Jr. et al. ................ 374/4

FOREIGN PATENT DOCUMENTS 0318039 11/1988 European Pat. Off. .
61-207936 3/1985 Japan .
62011384 7/1985 Japan .
01124073 11/1987 Japan .

OTHER PUBLICATIONS

Gresi, Onizieme Collogue Sur Le Traitement Du Signal Et Des Images, Nice, G. Jacovitti, R. Cusani; A Real Time Image Processor for Automatic Bright Spot Detection; Jun. 6, 1987; pp. 587–590; Rome, Italy.

*Primary Examiner*—William A. Cuchlinski, Jr.
*Assistant Examiner*—G. Bradley Bennett
*Attorney, Agent, or Firm*—Staas & Halsey

[57] ABSTRACT

An infrared image monitoring system according to the present invention includes an infrared camera and a visible light camera, both viewing the same scene to be monitored. The visible light camera has a threshold means, for example, an optical filter, to attenuate the visible light input to the visible light camera to a level below which the visible light camera can not detect the scene. The output of the visible light camera indicates reflections of the sun light which are brighter than a predetermined threshold level. The output of the visible light camera is superposed over the temperature pattern of the scene measured with the infrared camera, so that the area having the reflection is deleted from the data of the temperature pattern. Thus processed temperature data is further processed with a conventional process so as to judge whether a rise in the temperature data is abnormal or not. The temperature monitoring system is therefore prevented from an erroneous operation caused by a reflection of the sun light in the scene.

11 Claims, 6 Drawing Sheets

MONITORING SYSTEM EMPLOYING INFRARED IMAGE

CROSS-REFERENCE TO RELATED APPLICATIONS

The present invention is related to copending U.S. patent application No. 07/276,669 which was allowed on Oct. 17, 1990.

BACKGROUND OF THE INVENTION

1. Field of the Invention

The present invention relates to a system employing an infrared camera for monitoring an abnormal condition of facilities. More particularly, this invention relates to a monitoring system which can avoid a malfunction caused by a reflection of sun light, etc. when the reflection is within the scene to monitor.

2. Description of the Related Art

The monitoring system has been widely employed for monitoring, for example, an outdoor transformer station where many of large electric apparatus, such as, transformers, circuit breakers, are situated. If some part of these apparatus becomes abnormally hot due to some reason, this fact must be urgently detected so as to take a proper action. Therefore, an infrared camera is provided to constantly monitor the apparatus so that the temperature rise at the monitored apparatus caused from something abnormal can be urgently recognized by a person in charge of the monitor. Therefore, it is required for the monitoring system to accurately operate achieving low erroneous detection rate.

FIG. 1 schematically shows a block diagram of a prior art system disclosed in Japanese Unexamined Patent Publication Tokukai HEI-1-288086, which is also now pending in U.S. patent application No. 07/726,669. FIG. 2 shows a flow chart of the image processing in the FIG. 1 system. In the FIG. 1 system, the temperature data output from an infrared camera 1 is converted to digital data, which is then alternately stored in frame memories 3 and 4 according to a control of a write controller 2 (step 50 in FIG. 2). Next, for each of the pixels, the previously stored temperature data is subtracted from the last stored temperature data in a differential operator 5 (step 52). Prior to the differential operation, an offset-adding is operated so that the last stored temperature data becomes always higher than background data in the previously stored data (i.e. the data before the temperature rise takes place); accordingly, the results of the differential operation should always become positive (step 51). This is because, without the offset-adding operation, the result of the differential operation may become either positive or negative to cause a complicated differential operation. The output of differential operator 5 is input to a TV monitor 6, where the temperature rise data is displayed as an image, as well as sent to a binarization circuit 7, where only the area of the temperature-rise is obtained (step 53). That is, when the operation result exhibits the same value as the offset-added value the pixel is recognized to be in the background area (having no temperature rise); and when the operation result exhibits other values than the offset-added value the pixel is recognized to be in a temperature rising area. The output of binarization circuit 7 is input to a histogram operation circuit 8, where the temperature rise data is processed to make a histogram of pixel quantities grouped in predetermined temperature ranges (step 54). When the pixel quantities in particularly predetermined temperature ranges are more than a predetermined level, it is recognized that an abnormal state has taken place (step 55); then an alarm device 9 raises an alarm.

In the above monitoring system, a monitored object, for example a transformer installed in an outdoor transformer station, may be lighted by the sun to cause a bright reflection therefrom, which then may be input into the infrared camera to cause a problem. That is, if the temperature to be detected by the monitoring system is in the range of several tens of degrees centigrade to several hundreds of degrees centigrade and the reflecting light is also in the range of several tens of degrees centigrade to several hundreds of degrees centigrade, the reflection may cause the system to erroneously detect an erroneous temperature rise of the transformer. Similar problems may arise when the sun lights an automobile situated aside the transformer, and the reflection therefrom is input to the infrared camera. In the latter case, there is also another problem in that avoiding the reflection from the automobile to the camera may reduce the monitoring field of vision of the camera.

SUMMARY OF THE INVENTION

It is a general object of the invention, therefore to provide an infrared image monitoring system which precludes erroneous operation caused by a reflection of the sun light, etc..

An infrared image monitoring system according to the present invention comprises an infrared camera and a visible light camera, both viewing the same scene to be monitored. The visible light camera has a threshold means, for example, an optical filter, to attenuate the visible light input to the visible light camera down to a level below which the visible light camera can not detect the scene. The output of the visible light camera indicates an object which reflects the sun light brighter than a predetermined threshold level. The output of the visible light camera is superposed over the temperature pattern of the scene measured with the infrared camera, so that the area having the reflection is rejected from the data of the temperature pattern. Thus, processed temperature data is further processed with a conventional process so as to judge whether a rise in the temperature data is abnormal or not.

The above-mentioned features and advantages of the present invention, together with other objects and advantages, which will become apparent, will be more fully described hereinafter, with reference being made to the accompanying drawings which form a part hereof, wherein like numerals refer to like parts throughout.

DESCRIPTION OF THE PREFERRED EMBODIMENTS

Figure 1:
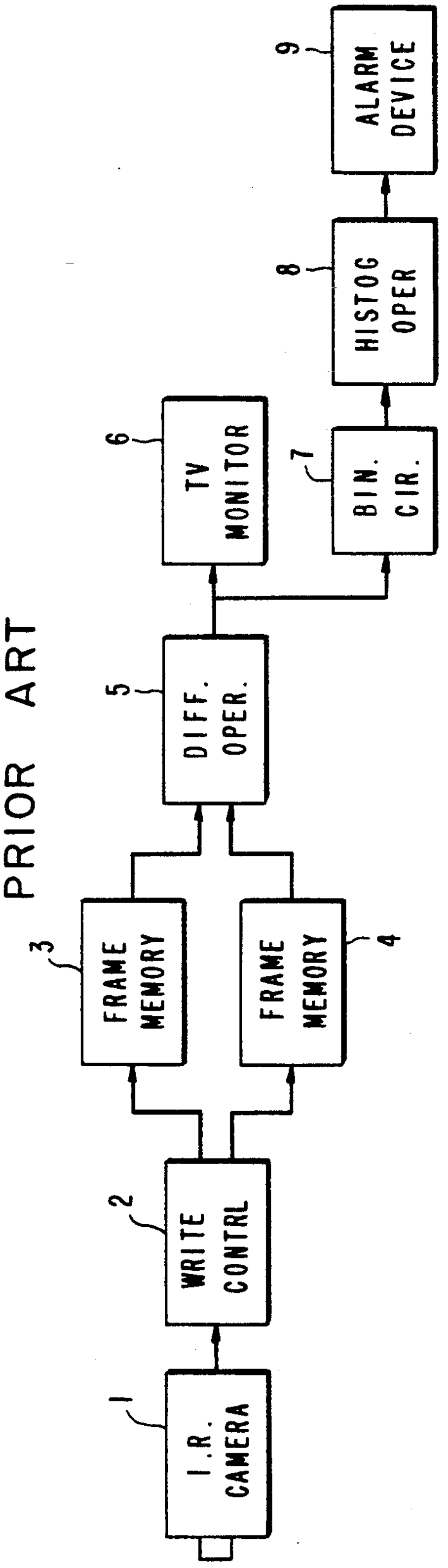
FIG. 1 PRIOR ART
FIG. 1 shows a prior art infrared image monitoring system.
Figure 3:
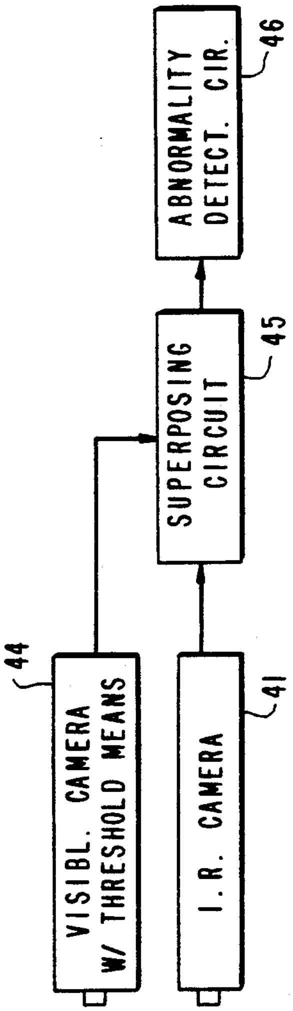
FIG. 3 shows a principle block diagram of the present invention.
Figure 2:
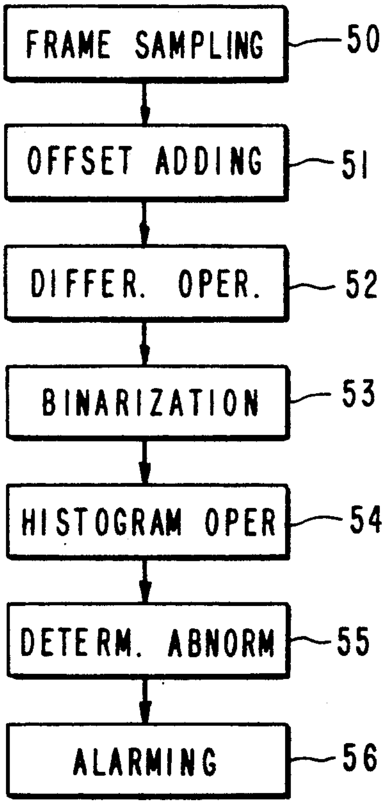
FIG. 2 PRIOR ART
FIG. 2 shows a flowchart of the FIG. 1 prior art system.

The principle of the present invention is hereinafter described in reference with a principle block diagram shown in FIG. 3. In the monitoring system according to the present invention, there are provided an infrared camera 41 to observe a temperature pattern of a scene to monitor, and a visible light camera comprising threshold means formed of a visible light filter or a comparator, 44 observes the same scene as the infrared camera. Attenuation characteristics of the filter is such that the visible light camera detects a visible light brighter than a threshold level reflected from the object to monitor. On area, i.e. pixels, where the visible light camera outputs the signal, the temperature data from the infrared camera is excluded by a superposing operation in a superposing circuit 45. The data signal after this exclusion is input to an abnormality recognizing circuit 46, where the erroneous infrared temperature data from the object whose temperature has not really risen but whose reflection is so bright is excluded in order to achieve a correct recognition of the abnormal state.

Figure 4:
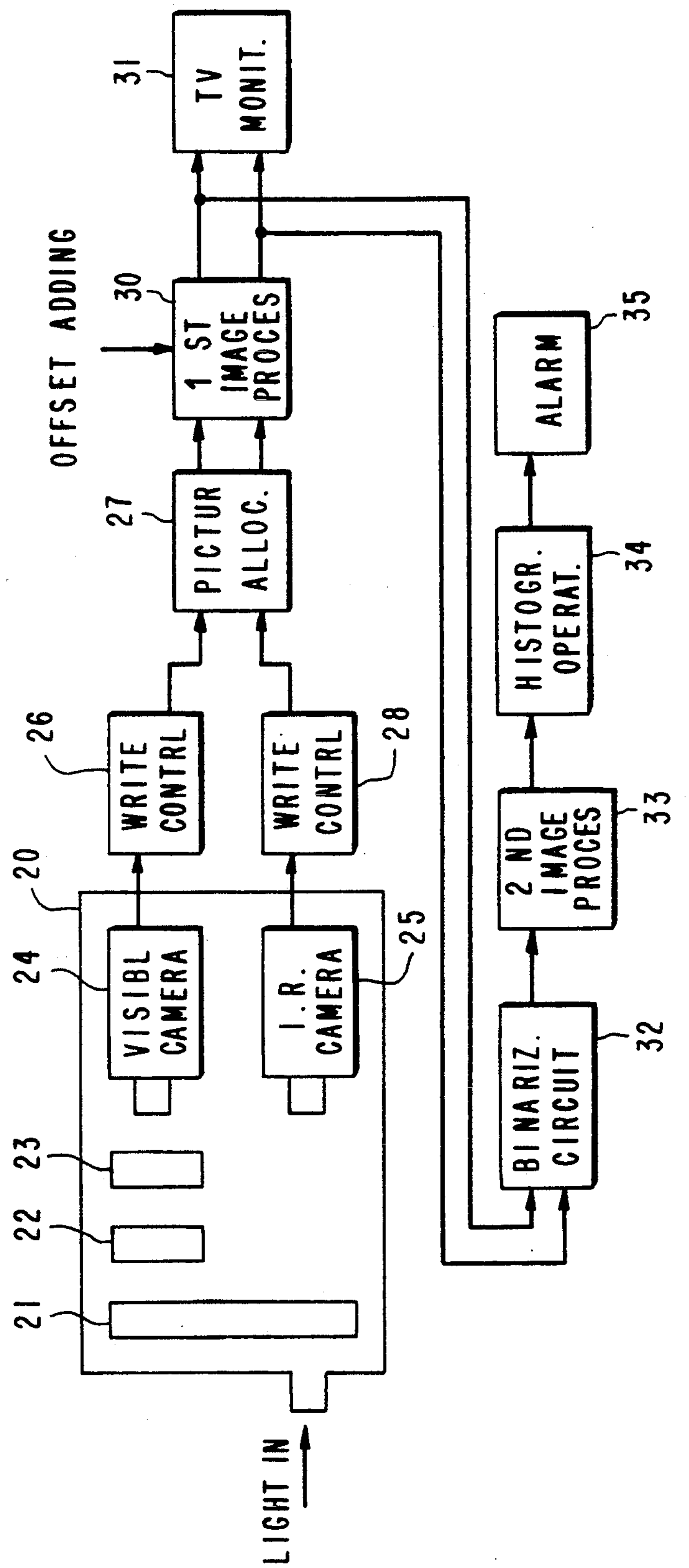
FIG. 4 shows a block diagram of a first preferred embodiment of the present invention.
Figure 5:
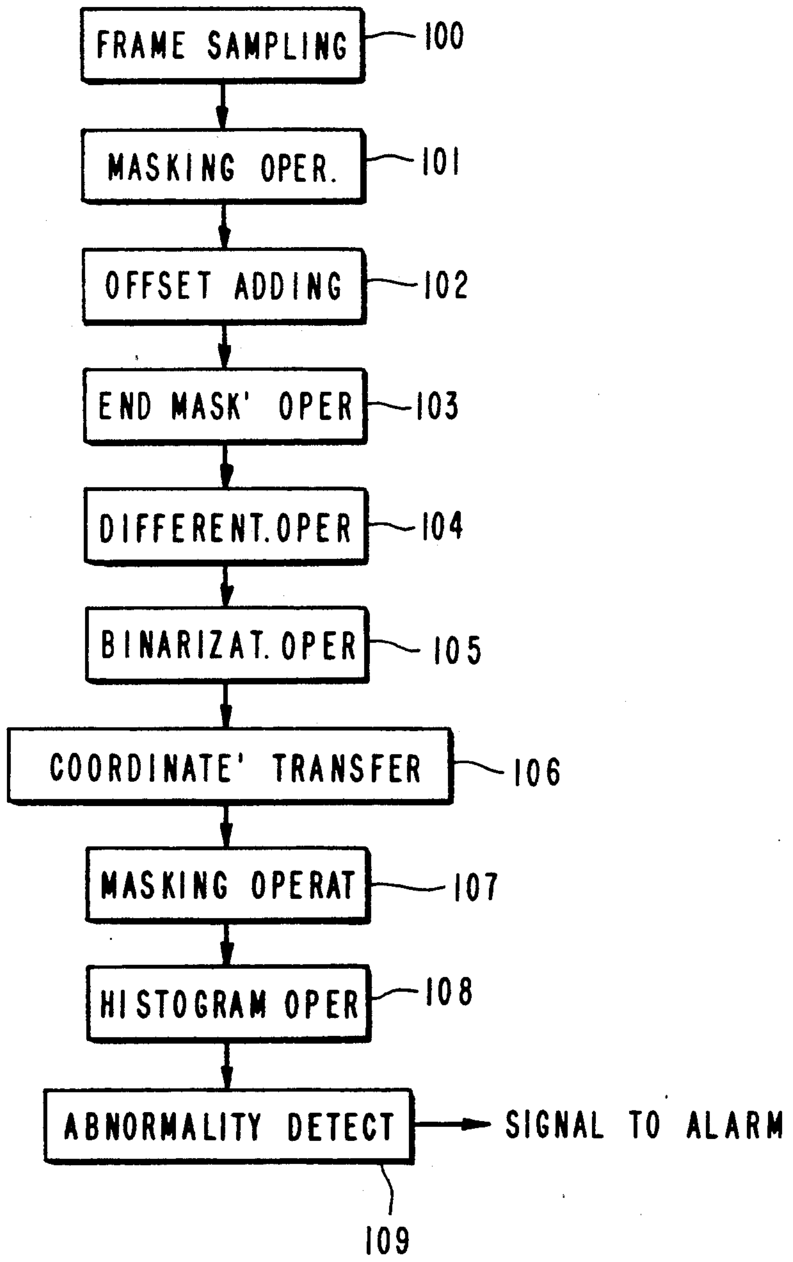
FIG. 5 shows a flowchart of the FIG. 4 first preferred embodiment.
Figure 6A:
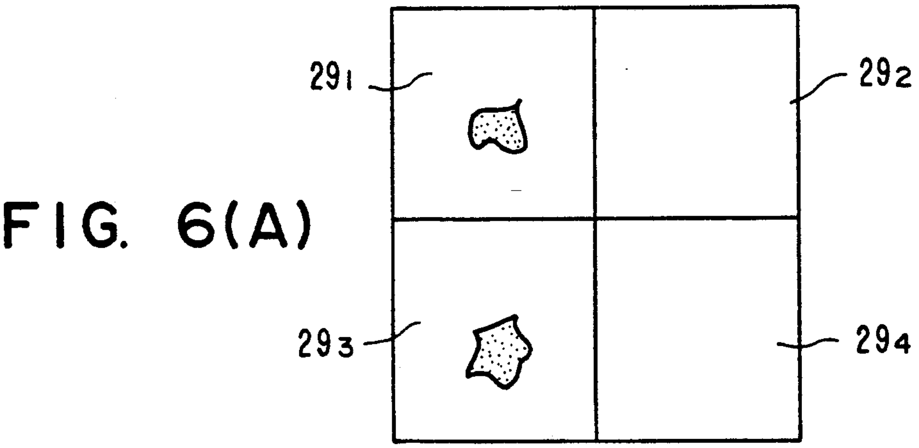
FIGS. 6(A)–(D) explain the concept of an image processing for rejecting the light-reflecting area from the temperature pattern in the first preferred embodiment.

FIG. 4 is a block diagram of a first preferred embodiment of the present invention. FIG. 5 shows a flowchart of the image processing carried out in the FIG. 4 system. In the FIG. 3 principle diagram, the superposing operation is carried out in superposing circuit 45; however, in the FIG. 4 first preferred embodiment the superposing operation is carried out during the image processing. In FIG. 4, the numeral 20 denotes a camera apparatus comprising a visible-light/infrared-light separator filter 21, a visible light attenuating filter 22 (detail of which will be described later), a zoom lens 23, a visible light camera 24 and an infrared camera 25. A light input to camera apparatus 20 is divided by separator filter 21 into a visible light and an infrared light. The divided visible light is attenuated by filter 22 so that only a bright visible light passing through the filter 22, such as a reflection of the sun light, is allowed to input via zoom lens 23 to visible light camera 24. The divided infrared light separated by separator filter 21 is input to infrared camera 25. Zoom lens 23 adjusts the frame size of the visible light image precisely to conform to that of the infrared image. Thus, only the reflection of the sun light is detected by visible light camera 24, while the temperatures of the monitored objects are detected by infrared camera 25. The reflection input to infrared camera 25 reaches the detectable range (3 um to 5 um) of the infrared detecting device used there; therefore, the objects having the temperature from several tens degrees centigrade to several hundred degrees centigrade are erroneously detected as high temperature objects. The output for each frame of visible light camera 24 is alternately stored in the first of two frame memories in picture allocator 27 according to the control of a first write controller 26, while output for each frame of infrared camera 25 is alternately stored in the second of two frame memories in picture allocator 27 according to the control of a second write controller 28 (step 100 in FIG. 5). First write controller 26 is synchronized by the output of second write controller 28 so that the horizontal/vertical scans of the visual light frame and the infrared frame are synchronized with each other. Picture allocator 27 is of the one widely employed in various fields for a four-division frame, where the output of visible light camera 24 is allocated to picture region 29, and the output of infrared camera 25 to picture region $29_3$ of FIG. 6(A), respectively. Thus, the visible light data and infrared data, both output from picture allocator 27, are processed in a first image processor 30 so as to become information on picture regions $29_1$ and $29_3$ for an offset-adding operation, while the data on picture regions $29_2$ and $29_4$ are masked (step 101 in FIG. 5). Then, the offset-adding is operated (step 102) so that the last stored temperature data becomes always higher than background data in the previously stored data (i.e. the data before the temperature rise takes place); accordingly, the results of a later differential operation becomes always positive. After finishing the offset operation, the data is returned back to the original picture regions $29_1$ and $29_3$ (step 103). Next, the differences of the previously stored frame data from the last stored frame data is operated (step 104). This differential operation is carried out for both the difference of the last stored frame data from the previously stored frame data of the visible light data on picture region $29_1$, as well as the difference of the last stored frame data from the previously stored frame data of the infrared light data on picture region $29_3$.

Figure 6B:
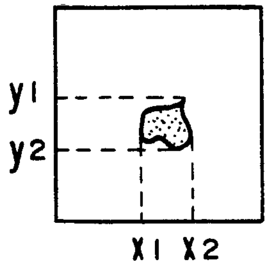
Figure 6C:
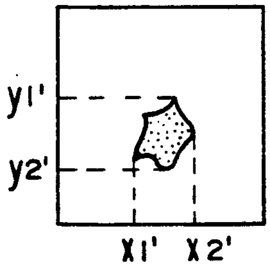

The differential outputs of the visible light picture and the differential outputs of the infrared picture, both from first image processor 30, are input to TV monitor 31 to display the images, as well as input to a binarization circuit 32 so that the visual light image is output only at the region where the reflection light has changed more than a predetermined brightness difference (referred to hereinafter as reflecting region), and the infrared image is output only at the regions where the temperature difference is over a predetermined threshold value, that is, at the reflecting regions and the region where a large temperature rise takes place (step 105). For example, in a case where a transformer installed in an outdoor substation is lighted with the sun light and, accordingly causes a strong reflection to be input to camera apparatus 20, and accidentally at the same time a part of this transformer gets heated with some reason, visible light camera 24 outputs only the reflecting region as shown in FIG. 6(B). Also, as in this situation, infrared camera 25 outputs the reflection changing region and the temperature rising region as shown in FIG. 6(C). In this case, it is very rarely probable that the location, i.e. the pixel coordinates ($X_1$, $X_2$, $Y_1$, $Y_2$), of the reflecting region of the sun light completely coincides with the location, i.e. the pixel coordinates ($X_1'$, $X_2'$, $Y_1'$, $Y_2'$), of both of the reflecting region and the temperature rising region; accordingly, it is usual that they do not coincide with each other.

As described above, the attenuation characteristics of visible light filter 22 is chosen such that a reflection less bright than a predetermined brightness can not be output from visible light camera 24; therefore, the attenuation is set at the range of, for example, 1/5 to 1/40.

The output of binarization circuit 32 is input to a second image processor 33, where the picture of FIG. 6(B) is used to modify the picture of FIG. 6(C) are superposed. The procedure is such that a coordinate transfer operation is carried out, that is, at first the binarized data of the visible light change and the binarized data of the infrared data change at the corresponding coordinates are taken out (step 106 in FIG. 5), and next, a masking operation is carried out for both of the taken out data (step 107). This masking operation is such that the reflecting region detected by visible light camera 24 is defined as a not-to-be-processed region having logic level "0" (whose coordinates are $X_1$, $X_2$, $Y_1$ and $Y_2$, and shown with a dotted region in FIG. 6(B)), and other region (shown as a white region in FIG. 6(B)) is defined as a region to detect temperature rise, having logic level "1", so that an AND operation is carried out with the infrared image data shown in FIG. 6(C). The reflecting region shown in FIG. 6(B) is not really abnormally heated on the transformer; therefore, the reflecting region is deleted in advance from the region to be processed for the abnormality detection. The region to be processed for the abnormality detection is shown as a hatched portion in FIG. 6(D). Next, the output of second image processor 33, i.e. the temperature rise data in the region to be processed for the abnormality detection, is input to histogram operation circuit 34, where the pixels having respective temperature rise data are counted for predetermined temperature ranges so that the histogram, i.e. the quantities versus the temperature ranges, is obtained (step 108 in FIG. 5). In this histogram, if the pixels having the temperature higher than the predetermined level are more than a predetermined quantity, it is recognized that an abnormal temperature rise state has taken place (step 109), so that alarm device 35 raises an alarm.

Figure 7:
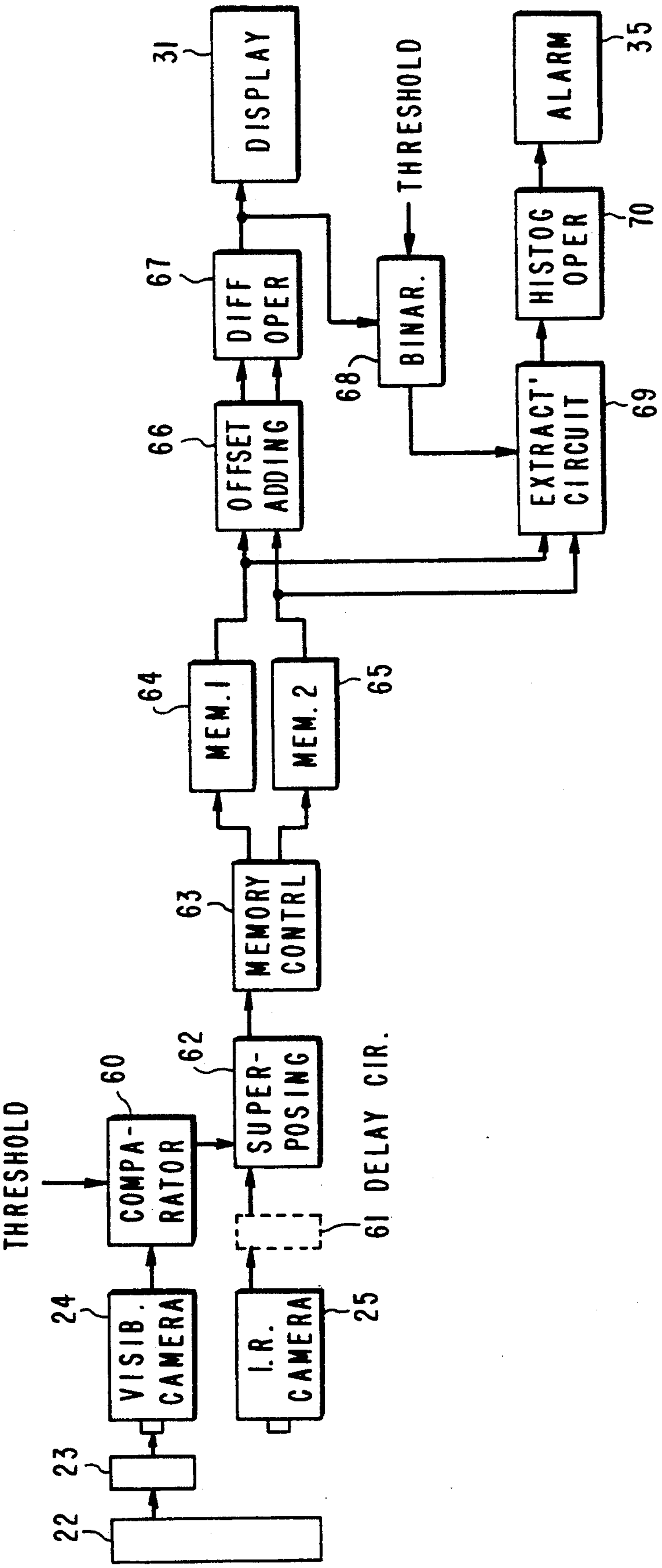
FIG. 7 shows a block diagram of a second preferred embodiment of the present invention.

A second preferred embodiment of the present invention is hereinafter described in reference to a block diagram shown in FIG. 7. The same or similar blocks are designated with the same numerals. The same scene is input via visible-light/infrared-light separator filter 21 and zoom lens 23 to visible light camera 24, as well as via visible-light/infrared-light separator filter 21 to infrared camera 25, respectively. Frames of these two cameras are scanned in synchronization with each other. Output signal of visible light camera 24 is compared with a predetermined threshold brightness level, in comparator 60, so that the logic level "0" is output when the signal is larger than the threshold level, as well as logic level "1" when the signal is smaller than the threshold level. Visible light camera 24 and comparator 60 constitute "visible light camera having a threshold means, 44" of the FIG. 3 principle diagram. Both of the visible light and infrared signals respectively output form both the cameras synchronized with each other, for the same object, i.e. for the pixels having the same address, are superposed on each other, i.e. multiplied with each other. If necessary, in order to achieve the synchronization, a delay circuit 61 may be provided to the output of the infrared camera 25. Due to the threshold level of comparator 60 which has been preset so that a light brighter than this threshold level is recognized as a reflection of the sun light, the infrared signal obtained from an object having the sun light reflection is deleted. The signal from which the infrared signal from a reflecting object has been thus deleted is processed by a conventional image processing means to judge whether the temperature rise in the infrared signal is abnormal or not.

A typical configuration of the image processing means to judge the abnormal state is hereinafter described in reference to FIG. 7. Memory controller 63 controls the infrared signal, for each frame, output from multiplication circuit 62 to store alternately in memories 64 and 65. Outputs from frame memories 64 and 65 are respectively added with an offset value in offset adder 66, outputs from which are input to differential operator 67. Differential operator 67 outputs a temperature rise, i.e. the difference of the offset-added temperature in the last frame from the offset-added temperature of the previous frame. This differential value is displayed on display device 31 as well as binarized by a predetermined second threshold value in binarization circuit 68. Moreover, outputs of frame memories 64 and 65 are respectively input to a signal extraction circuit 69, where the temperature rise data higher than the second threshold level is extracted so as to be input to histogram operation circuit 70. Histogram operation circuit 70 groups the temperature data into predetermined temperature ranges, and counts the quantity of pixels grouped in each group. According to thus grouped data, the size and temperature of the temperature rising object are compared with a predetermined standard size and temperature so as to determine whether the object is abnormal or not. When it is determined abnormal, a signal is output to alarm device 35.

Thus, according to the present invention the part reflecting the sun light is detected by the visible light camera 24 so as to be deleted in advance from the abnormality detection range; therefore, the actual temperature-rising part can be accurately detected by the infrared camera.

Furthermore, even in the case where a side-mirror, for example, of a car parking beside the transformer under the monitoring in an outdoor substation is reflecting the sun light towards the camera apparatus 20, i.e. in the case where the reflection is apart from the monitored object, the operations are carried out in the same way as described above, so that the erroneous temperature rise data caused from the reflection is deleted from the abnormality detection processing.

Figure 6D:
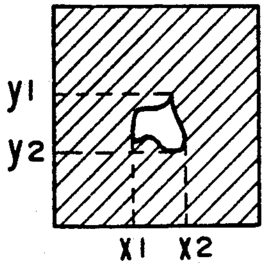

In the case where no temperature rise takes place on the transformer, but the sun light reflection is existing in the scene, no abnormal state is detected by the histogram operation in the region to monitor the abnormality (the hatched area in FIG. 6(D)). In the contrary case where no reflection is existing but a temperature rise is existing on the transformer, the histogram operation for the hatched area of FIG. 6(D) detects the temperature rise of the object.

Four-division frame employed for the picture allocator 27 in the first preferred embodiments may be replaced with a video switcher, which switches the inputs to a single write controller alternately from the visible light camera and from the infrared camera, so that the visible light picture and the infrared picture are alternately processed. In this circuit configuration, it is required that visible light camera 24 and infrared camera 25 concurrently watch the same scene, and the data in their last and previous frames are respectively obtained.

Though in the above preferred embodiments the histogram operation is employed for recognizing an abnormal temperature rising state, it is apparent that any other conventional method can be employed to determine the abnormal state after the reflecting object is removed from the temperature data.

Though in the first preferred embodiment filter 22 is employed for attenuating the light input to the visible light camera 24, it is apparent that a diaphragm may be employed to reduce the aperture of the visible light camera.

Through in the above preferred embodiments the frames of the visible light camera and the infrared camera are scanned in synchronization, accordingly have respectively the same number of the pixels, it is apparent that the synchronization and the same pixel number are not always necessary for the present invention. In other words, the visible light camera may be of a high resolution type usable for a visual monitoring by a human, where a plurality of the pixels are combined so as to correspond to a single infrared pixel of the corresponding coordinates, so that the superposition operation can be carried out.

The many features and advantages of the invention are apparent from the detailed specification and thus, it is intended by the appended claims to cover all such features and advantages of the system which fall within the true spirit and scope of the invention. Further, since numerous modifications and changes may readily occur to those skilled in the art, it is not desired to limit the invention to the exact construction and operation shown and described, and accordingly, all suitable modifications and equivalents may be resorted to, as falling within the scope of the invention.

What is claimed is:

1. A temperature monitoring system for viewing visible and infrared input light from a scene to be monitored, comprising:

a visible light camera having threshold means having a threshold light level, said visible light camera viewing visible input light from the scene to be monitored, said visible light camera outputting a visible light signal including a first plurality of pixels, said visible light signal being at a first logic level for each of the first plurality of pixels having a corresponding visible input light which is less bright than said threshold light level, and said visible light signal being at a second logic level for each of the first plurality of pixels having a corresponding visible input light which is brighter than or as bright as said threshold light level;

an infrared camera for viewing infrared input light from the scene to be monitored, and for outputting a first temperature data for each of a second plurality of pixels which correspond to each of the first plurality of pixels of said visible light camera; and superposing means for excluding said first temperature data corresponding to each of the first plurality of pixels of the visible light signal having the second logic level, from said first temperature data so that said first temperature data corresponding to each of the first plurality of pixels of the visible light signal being at the first logic level is output from said superposing means as a second temperature data which is processed to determine an abnormal temperature rise state in said scene to be monitored.

2. A temperature monitoring system as recited in claim 1, wherein each of the first and second plurality of pixels is synchronously updated.

3. A temperature monitoring system as recited in claim 1, wherein said threshold means is an optical filter for attenuating the visible input light to said visible light camera.

4. A temperature monitoring system as recited in claim 3, wherein said optical filter attenuates the visible input light to a level at which the visible input light which is brighter than or as bright as said threshold light level is output by the visible light camera as corresponding ones of the first plurality of pixels of the visible light signal at the second logic level.

5. A temperature monitoring system as recited in claim 1, wherein said threshold means is a comparator which outputs said first logic level for the corresponding visible input light which is less bright than the threshold light level.

6. A temperature monitoring system as recited in claim 1, wherein said first logic level is "1" and said second logic level is "0", and said superposing means performs a multiplication operation of each of said first temperature data with corresponding ones of said first plurality of pixels of said visible light signal.

7. A temperature monitoring system as recited in claim 1, further comprising:

abnormality detection means for receiving the second temperature data, and for determining whether an abnormal temperature rise state exists in the scene to be monitored based on the second temperature data.

8. A method for eliminating a false detection of an abnormal temperature condition in a scene to be monitored by a temperature monitoring system, comprising the steps of:

comparing visible light from the scene to be monitored with a threshold level to provide a result; and deleting selected bits or data corresponding to infrared light from the scene to be monitored based on the result before determining whether the abnormal temperature condition exists.

9. A method for eliminating a false detection of an abnormal temperature condition in a scene to be monitored, comprising the steps of:

a) generating first data corresponding to visible light from the scene to be monitored having data values greater than or equal to a threshold level;

b) generating second data corresponding to infrared light form the scene to be monitored; and c) deleting a first part of the second data, corresponding to the first data.

10. A method as recited in claim 1, further comprising the step of:

d) determining whether the abnormal temperature condition exists in the scene to be monitored based on a second part of the second data which remains after the deleting of said step (c).

11. A method for eliminating a false detection of an abnormal temperature condition in a scene to be monitored by a monitoring system, comprising the steps of:

a) comparing visible light from the scene to be monitored with a threshold level to provide a result; and b) disregarding selected bits of data corresponding to infrared light from the scene to be monitored based on the result in determining whether the abnormal temperature condition exists.

* * * * *

UNITED STATES PATENT AND TRADEMARK OFFICE

CERTIFICATE OF CORRECTION

PATENT NO. : 5,133,605

DATED : July 28, 1992

INVENTOR(S) : Nakamura

It is certified that error appears in the above-identified patent and that said Letters Patent is hereby corrected as shown below:

Title Page [56], line 6, change "Olson" to --Olsson--.

Column 1, line 36, change "07/726,669" to --07/276,669--.

Signed and Sealed this

Twelfth Day of October, 1993

Attest:

BRUCE LEHMAN

*Attesting Officer*

*Commissioner of Patents and Trademarks*